United States Patent
Lee et al.

(10) Patent No.: US 10,966,259 B2
(45) Date of Patent: Mar. 30, 2021

(54) METHOD FOR PERFORMING MANAGEMENT OF DIFFERENT IDS IN A RELAY UE IN WIRELESS COMMUNICATION SYSTEM AND A DEVICE THEREFOR

(71) Applicant: LG Electronics Inc., Seoul (KR)

(72) Inventors: Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/481,325

(22) PCT Filed: Jan. 23, 2018

(86) PCT No.: PCT/KR2018/000993
§ 371 (c)(1),
(2) Date: Jul. 26, 2019

(87) PCT Pub. No.: WO2018/139829
PCT Pub. Date: Aug. 2, 2018

(65) Prior Publication Data
US 2019/0357280 A1    Nov. 21, 2019

Related U.S. Application Data

(60) Provisional application No. 62/450,570, filed on Jan. 26, 2017.

(51) Int. Cl.
*H04W 76/11* (2018.01)
*H04W 88/04* (2009.01)
(52) U.S. Cl.
CPC .......... *H04W 76/11* (2018.02); *H04W 88/04* (2013.01)

(58) Field of Classification Search
CPC ..... H04W 76/11; H04W 88/04; H04W 92/18; H04W 8/26
See application file for complete search history.

(56) References Cited

U.S. PATENT DOCUMENTS

2009/0190522 A1*  7/2009  Horn ..................... H04W 40/30
                                                         370/315
2012/0009866 A1   1/2012  Zhang et al.
(Continued)

FOREIGN PATENT DOCUMENTS

EP    2871910    5/2015

OTHER PUBLICATIONS

3rd Generation Partnership Project; Technical Specification Group Services and System Aspects; "Proximity-based services (ProSe); Stage 2 (Release 14)," 3GPP TS 23.303 V14.1.0, dated Dec. 2016, 126 pages.
(Continued)

*Primary Examiner* — Jung H Park
*Assistant Examiner* — Harry H Kim
(74) *Attorney, Agent, or Firm* — Fish & Richardson P.C.

(57) ABSTRACT

The present invention relates to a wireless communication system. More specifically, the present invention relates to a method and a device for performing management of different IDs in a Relay UE in wireless communication system, the method comprising: receiving information for mapping table between a set of first identifiers (IDs) and a set of second IDs from a network; receiving a UL packet, which is to be forwarded to the network, without a second ID from the remote UE identified by a first ID associated with the second ID according to the mapping table; adding the second ID associated with the first ID to the UL packet; and transmitting the UL packet with second ID to the network. The UE is capable of communicating with at least one of
(Continued)

another UE, a UE related to an autonomous driving vehicle, a base station or a network.

11 Claims, 10 Drawing Sheets

(56) References Cited

U.S. PATENT DOCUMENTS

| | | | |
|---|---|---|---|
| 2012/0287937 A1* | 11/2012 | Kaya | H04L 45/28 |
| | | | 370/401 |
| 2013/0301438 A1* | 11/2013 | Li | H04L 5/001 |
| | | | 370/252 |
| 2014/0308966 A1* | 10/2014 | Wang | H04W 16/10 |
| | | | 455/450 |
| 2016/0285934 A1 | 9/2016 | Cheng et al. | |
| 2018/0063691 A1* | 3/2018 | Shuman | H04W 8/005 |
| 2018/0092079 A1* | 3/2018 | Tang | H04W 76/10 |
| 2018/0234862 A1* | 8/2018 | Lee | H04W 76/20 |
| 2019/0045573 A1* | 2/2019 | Schliwa-Bertling | |
| | | | H04W 76/11 |

OTHER PUBLICATIONS

PCT International Search Report and Written Opinion in International Application No. PCT/KR2018/000993, dated May 24, 2018, 12 pages.

\* cited by examiner

(a) Control-Plane Protocol Stack (b) User-Plane Protocol Stack

METHOD FOR PERFORMING MANAGEMENT OF DIFFERENT IDS IN A RELAY UE IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/000993, filed on Jan. 23, 2018, which claims the benefit of U.S. Provisional Application No. 62/450,570, filed on Jan. 26, 2017. The disclosures of the prior applications are incorporated by reference in their entirety.

TECHNICAL FIELD

The present invention relates to a wireless communication system and, more particularly, to a method for performing management of different IDs in a Relay UE in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
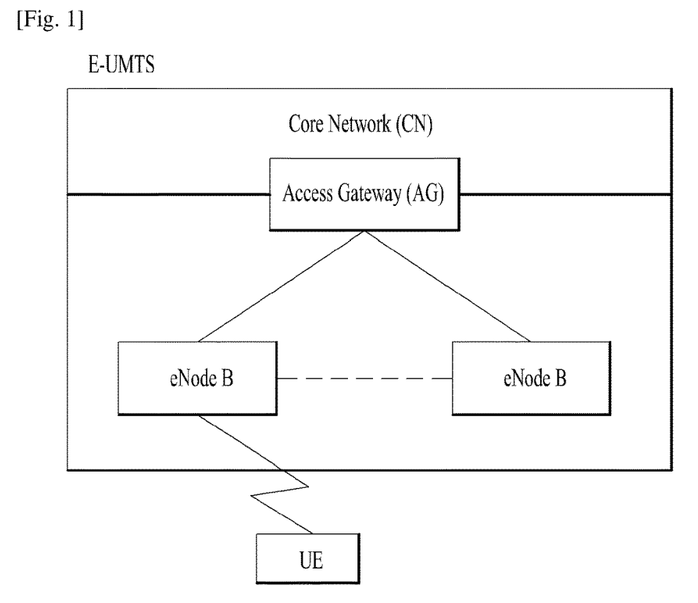
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for performing management of different IDs in a Relay UE in wireless communication system.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In this invention, it is proposed of a few methods for managing the relationship between RAT specific remote UE identifier and network allocated remote UE identifier.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
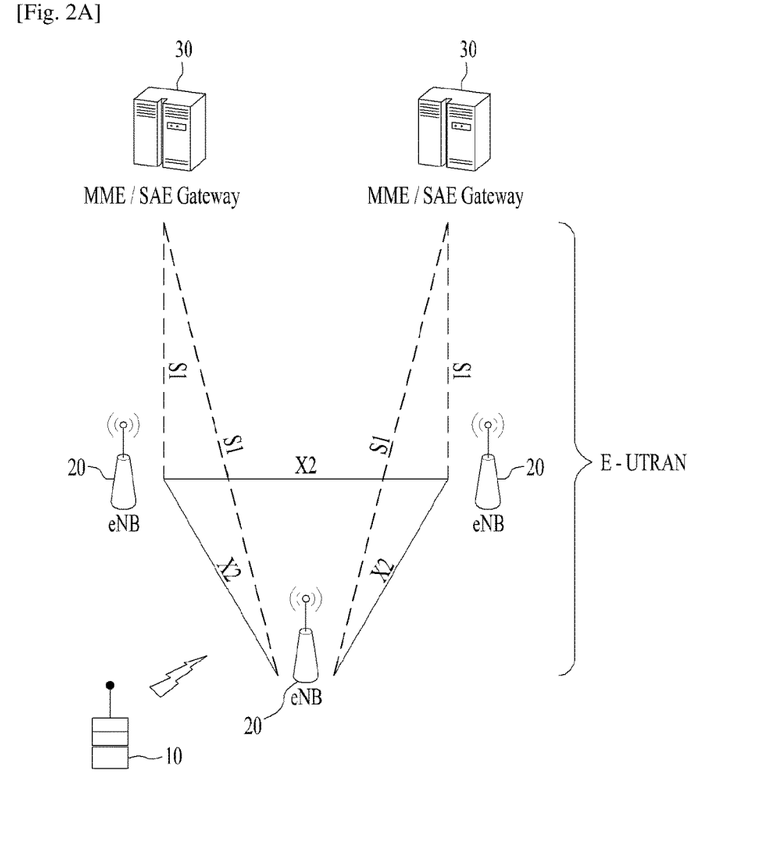
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
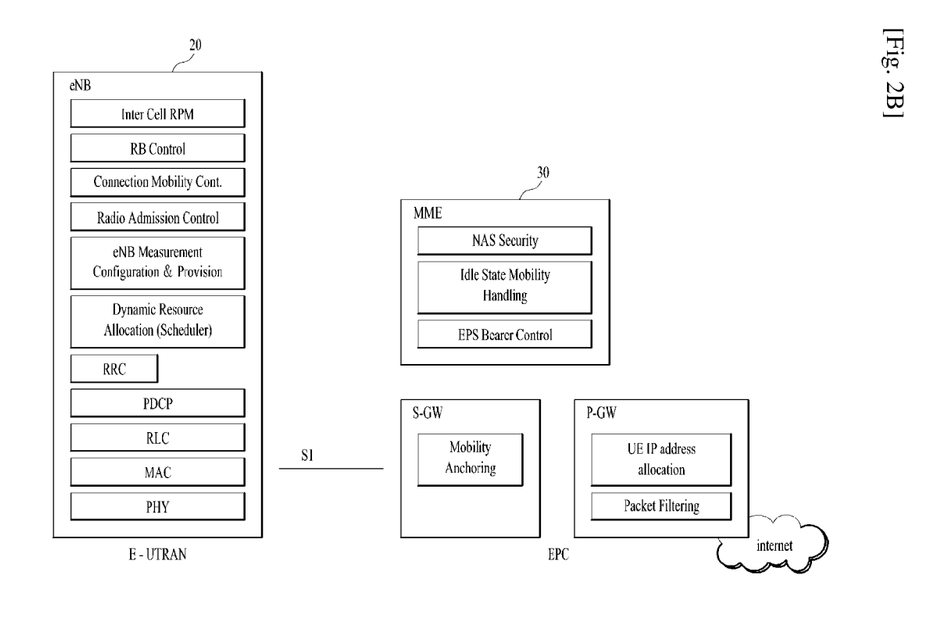
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
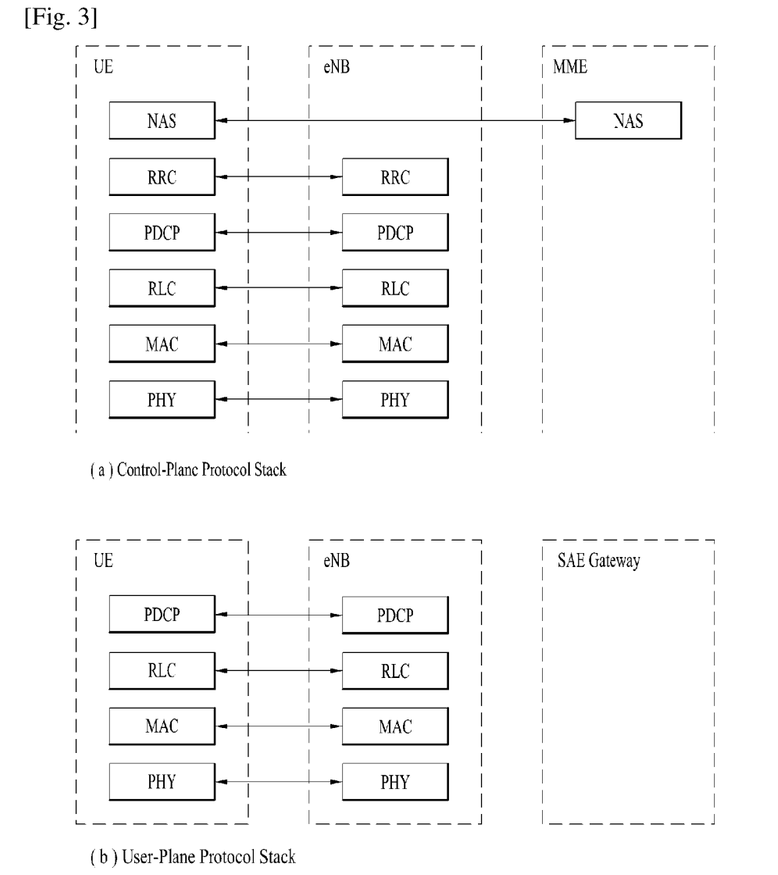
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
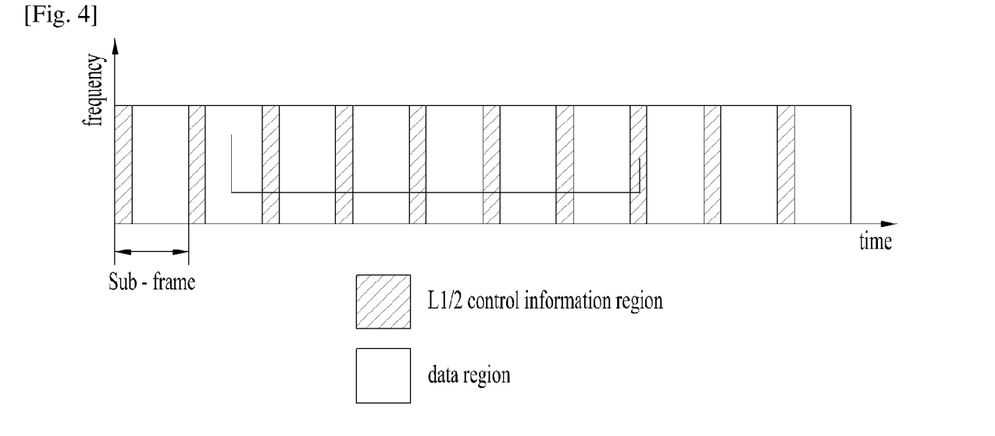
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
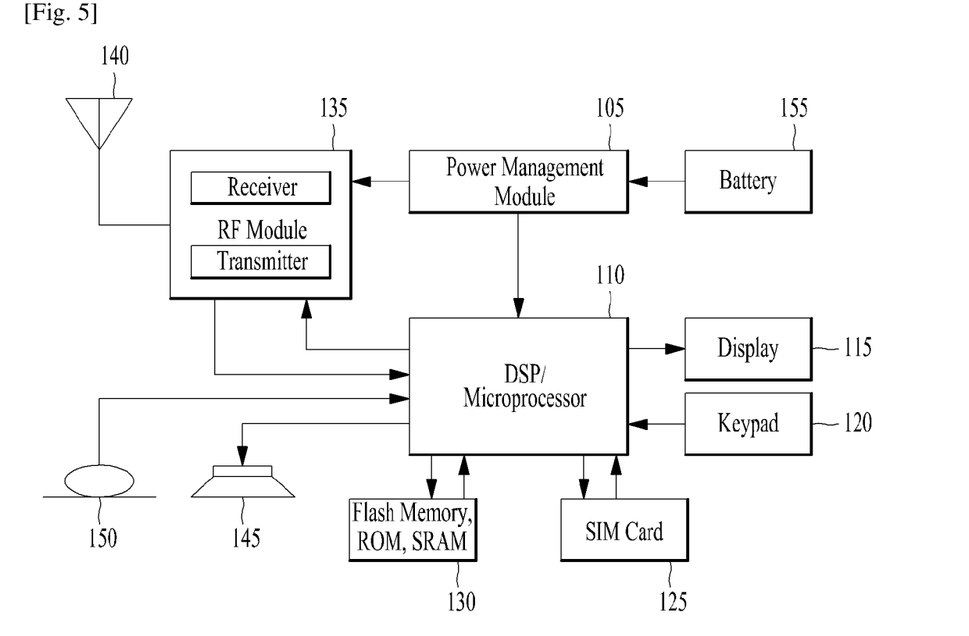
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and

RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
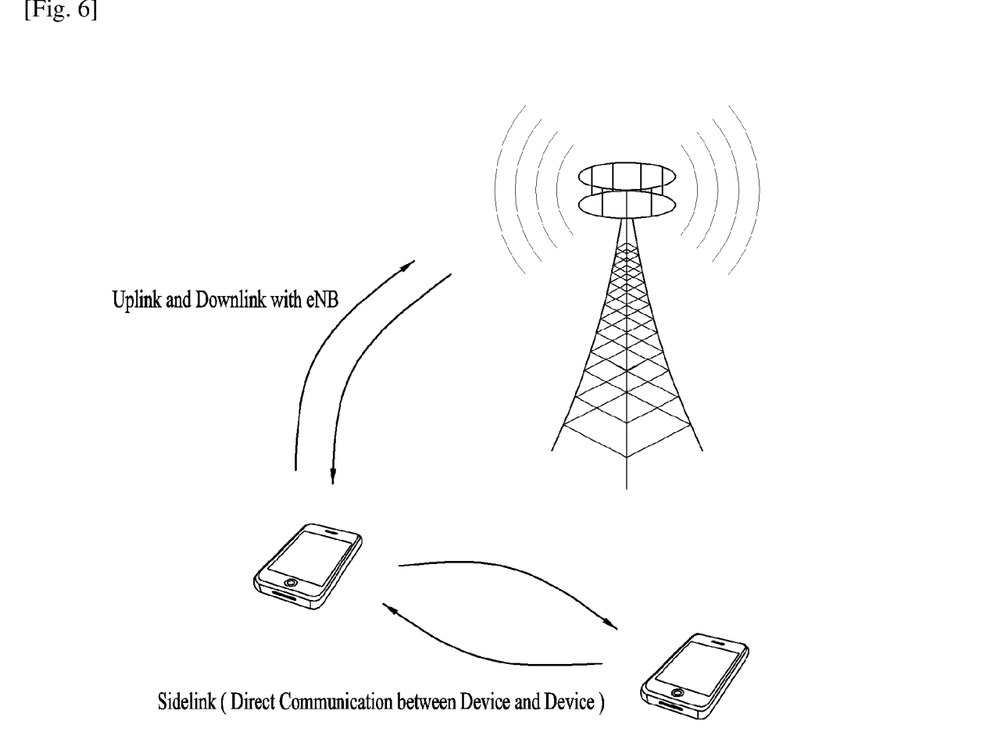
FIG. 6 is a conceptual diagram for sidelink communication.

FIG. 6 is a conceptual diagram for sidelink communication.

Sidelink comprises sidelink discovery, sidelink communication and V2X sidelink communication between UEs. Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:
 i) Uu transmission/reception (highest priority);
 ii) PC5 sidelink communication transmission/reception;
 iii) PC5 sidelink discovery announcement/monitoring (lowest priority).

The UE performs transmission and reception over Uu and PC5 with the following decreasing priority order in case Sidelink Discovery Gap is configured:
 i) Uu transmission/reception for RACH;
 ii) PC5 sidelink discovery announcement during a Sidelink Discovery Gap for transmission;
 iii) Non-RACH Uu transmission;
 iv) PC5 sidelink discovery monitoring during a Sidelink Discovery Gap for reception;
 v) Non-RACH Uu reception;
 vi) PC5 sidelink communication transmission/reception.

Figure 7A:
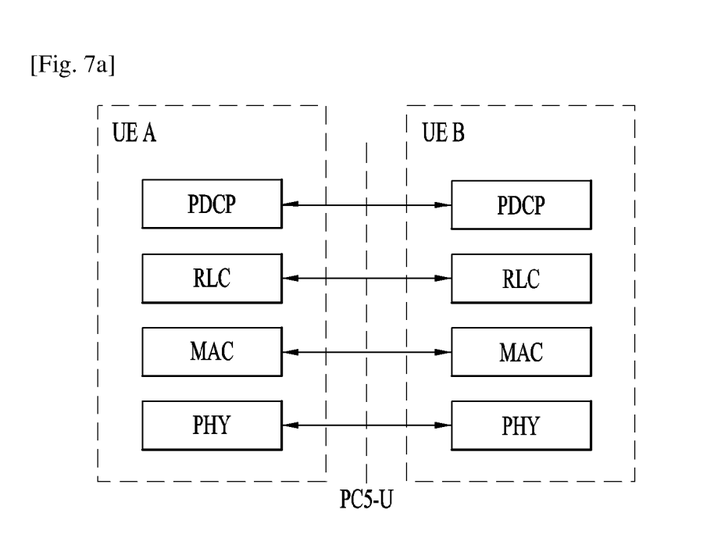
FIG. 7a is a diagram for protocol stack for the user plane of sidelink communication.
Figure 7B:
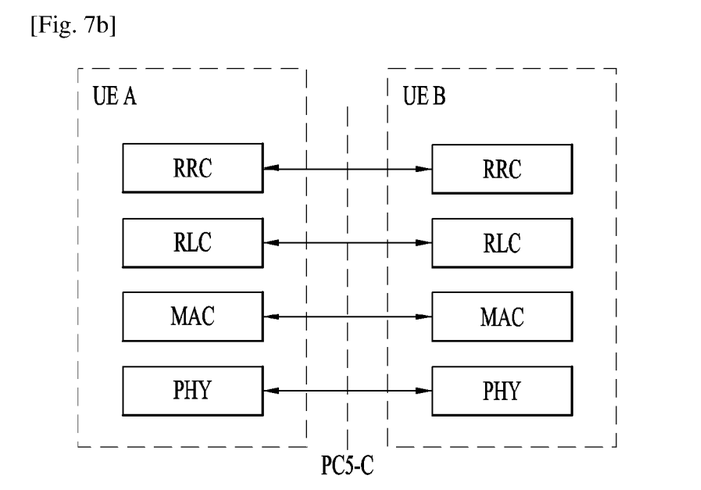
FIGS. 7b and 7c are diagrams for protocol stack for the control plane of sidelink communication.
Figure 7C:
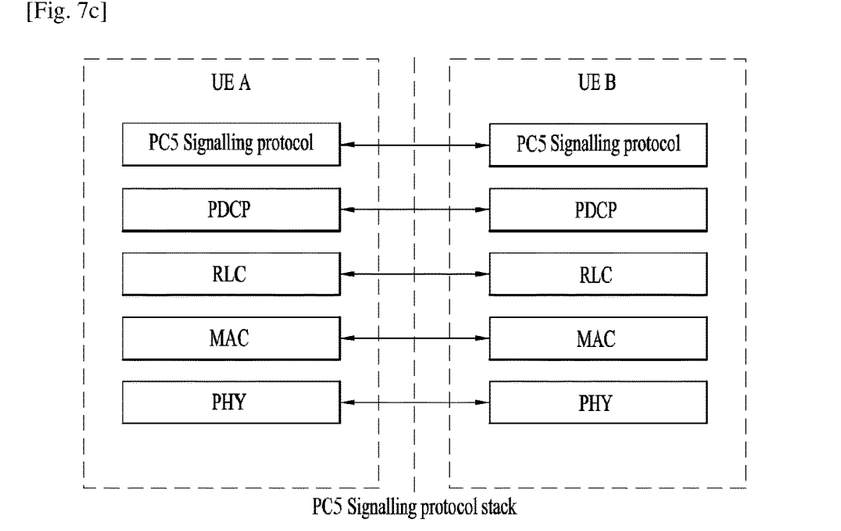

FIG. 7a is a diagram for protocol stack for the user plane of sidelink communication, FIGS. 7b and 7c are diagrams for protocol stack for the control plane of sidelink communication;

FIG. 7a shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7a.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7b.

The control plane for establishing, maintaining and releasing the logical connection for one-to-one sidelink communication is shown in FIG. 7c.

FIGS. 8a to 8d are examples for radio protocol stacks for Layer-2 evolved UE-to-Network relay.

In FIGS. 8a to 8d, a protocol architecture for supporting Layer 2 evolved UE-to-Network Relay UE is given for the user plane and the control plane.

Figure 8A:
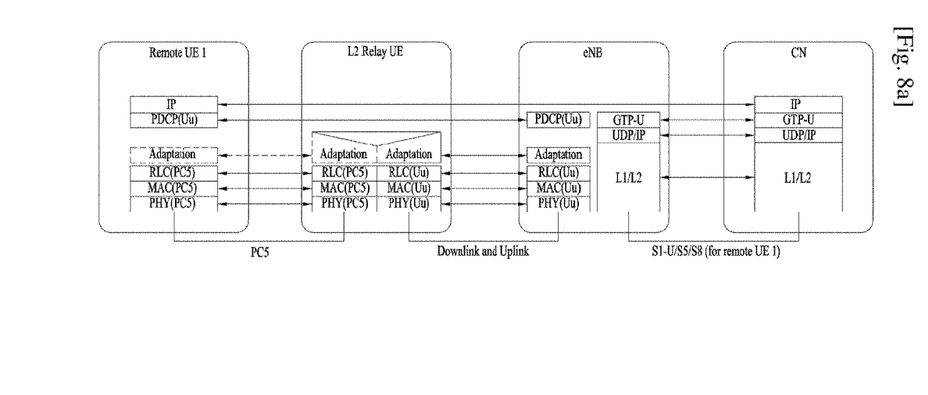
FIGS. 8a to 8d are examples for radio protocol stacks for Layer-2 evolved UE-to-Network relay.
Figure 8B:
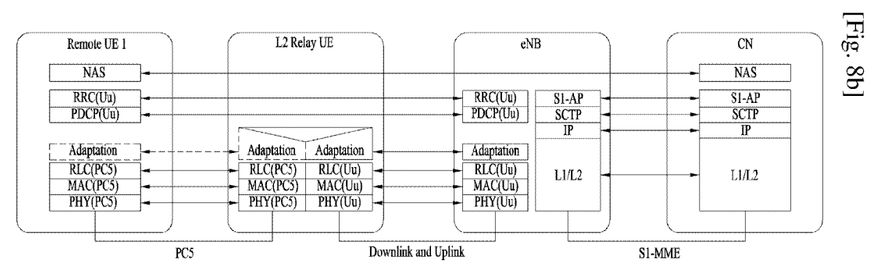
Figure 8C:
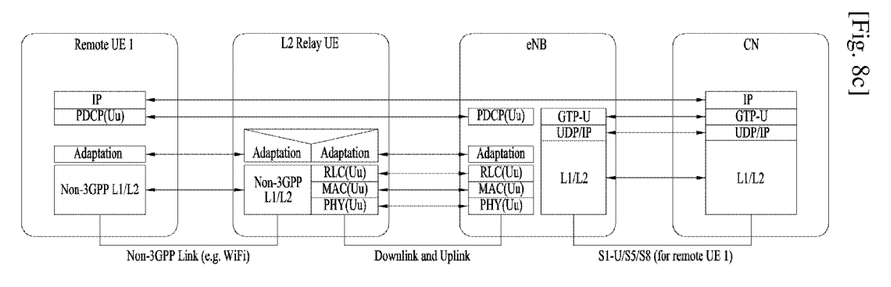
Figure 8D:
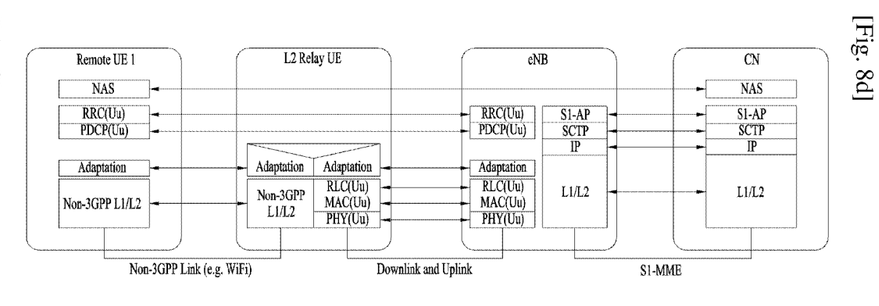

For protocol architecture for the user plane and control plane, relaying is performed above RLC sublayer. The evolved ProSe Remote UE's user plane and control plane data are relayed above RLC via the evolved ProSe UE-to-Network Relay UE from the evolved ProSe Remote UE to network and vice versa. Uu PDCP and RRC are terminated between the evolved ProSe Remote UE and the eNB while RLC, MAC and PHY and the non-3GPP transport layers are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 8a and FIG. 8b. The user plane protocol stack and the control plane protocol stack when non-3GPP access is used between the evolved ProSe remote UE and the evolved ProSe UE-to-Network Relay UE is shown in FIG. 8c and FIG. 8d.

When PC5 interface is used between the evolved ProSe remote UE and the evolved ProSe UE-to-Network Relay UE, by introducing a relay UE for UE-to-network relay, a Remote UE transmits data to an eNB via the Relay UE, and the eNB transmits data to the Remote UE via the Relay UE. I.e., the Relay UE relays data to/from eNB.

As data transfer between the remote UE and the Relay UE is ProSe communication, the Relay UE is communicating with the Remote UE over PC5 interface. In the meantime, as data transfer between the Relay UE and the eNB is a normal uplink/downlink (Uu) communication, the Relay UE is communicating with the eNB over Uu interface.

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorised by upper layers and can be in-coverage of the Public Safety ProSe Carrier or out-of-coverage on any supported carriers including Public Safety ProSe Carrier for UE-to-Network Relay discovery, (re) selection and communication. The ProSe UE-to-Network Relay is always in-coverage of EUTRAN. The ProSe UE-to-Network Relay and the Remote UE perform sidelink communication and sidelink discovery.

A ProSe UE-to-Network Relay performing sidelink communication for ProSe UE-to-Network Relay operation has to be in RRC_CONNECTED. After receiving a layer-2 link establishment request or TMGI monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The Remote UE can decide when to start monitoring for ProSe UE-to-Network Relay discovery. The Remote UE can transmit ProSe UE-to-Network Relay discovery solicitation messages while in RRC IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

The Remote UE performs radio measurements at PC5 interface and uses them for

ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Within a Uu DRB, different evolved ProSe Remote UEs and different bearers of the evolved ProSe Remote UE are indicated by additional information included in adaptation layer header which is added to PDCP PDU. An adaptation layer is supported over non-3GPP access for the short range link between the evolved ProSe Remote UE and the evolved ProSe UE-to-Network Relay UE. Adaptation layer header is added to PDCP PDU.

Depending on RAT between remote UE and the relay UE, different identifier could be used for relay UE to identify remote UE. For instance, in case of WLAN link between remote UE and the relay UE, WLAN mac address or other WLAN specific identifier is used for communicating with each other. When the remote UE is connected to the network directly or indirectly (i.e. via relay UE), a new identity (e.g. C-RNTI) is likely to be allocated to the remote UE to be used for communicating between remote UE and network. Hence, the two distinct identifiers could be used by remote UE.

In the case of a particular sidelink RAT type that the size of the network allocated ID is smaller than the size of the sidelink RAT ID (i.e., C-RNTI), the relay UE is more efficient to relay data using network allocated ID than sidelink RAT ID.

In this circumstances, if the relay UE and/or network does not have mapping information between RAT specific identifier (used in sidelink) and the identifier allocated by the network, the relay UE and/or eNB could not forward the data correctly.

Figure 9:
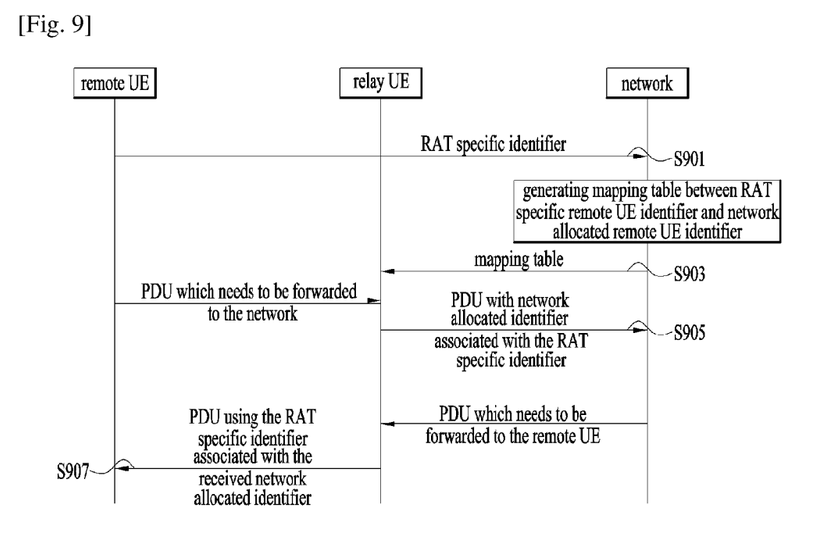
FIGS. 9 and 10 are a conceptual diagrams for performing management of different IDs in a Relay UE in wireless communication system according to embodiments of the present invention.

FIG. 9 is a conceptual diagram for performing management of different IDs in a Relay UE in wireless communication system according to embodiments of the present invention.

In the methods, the network become aware of RAT specific identifier of the remote UE and configures the relay UE with the mapping table between RAT specific remote UE identifier and network allocated remote UE identifier.

If the RRC CONNECTED UE is interested to sidelink operation, the remote UE is capable of sidelink operation and the cell supports the sidelink operation, the remote UE informs its RAT specific identifier to the network (S901).

Preferably, the RRC message (e.g. sidelink UE information) is used to inform the identity.

Preferable, the remote UE knows that the cell supports the sidelink operation via i) receiving indication which shows whether the cell supports the sidelink operation, or ii) receiving broadcasted related SIB.

There are various RAT specific identifiers according to sidelink communication type between the remote UE and the relay UE.

For example, if sidelink communication type between the remote UE and the relay UE is WLAN, the RAT specific identifiers can be SSID, BSSID, or HESSID. If sidelink communication type between the remote UE and the relay UE is 3GPP, the RAT specific identifiers can be ProSe UE ID. If sidelink communication type between the remote UE and the relay UE is Bluetooth, the RAT specific identifiers can be device ID or Bluetooth address.

When the remote UE is configured to connect to relay UE by the network, the network configures the relay UE with the mapping table between RAT specific remote UE identifier and network allocated remote UE identifier (S903).

Preferably, network allocated remote UE identifier can be C-RNTI, resume identity, S-TMSI, and other eNB allocated identifier.

Preferably, a size of the RAT specific remote UE identifier (i.e. ProSe UE ID is 24 bit strings) is larger than a size of the network allocated remote UE identifier (i.e. C-RNTI is 16 bit strings).

After constructing mapping table, if the relay UE receives packet/PDU (which needs to be forwarded to the network) without network allocated identifier from the remote UE, the adaption layer of the relay UE adds network allocated identifier associated with the RAT specific identifier of the remote UE and transmits the received packet to the network (S905).

After constructing mapping table, if the relay UE receives PDU (which needs to be forwarded to the remote UE) with network allocated identifier from the network, the adaption layer of the relay UE removes network allocated remote UE identifier and sends the received PDU to the remote UE using the RAT specific identifier associated with the received network allocated identifier (S907).

The above RAT specific identifier is forwarded from source network to the target network when the UE performs inter-eNB handover.

Figure 10:
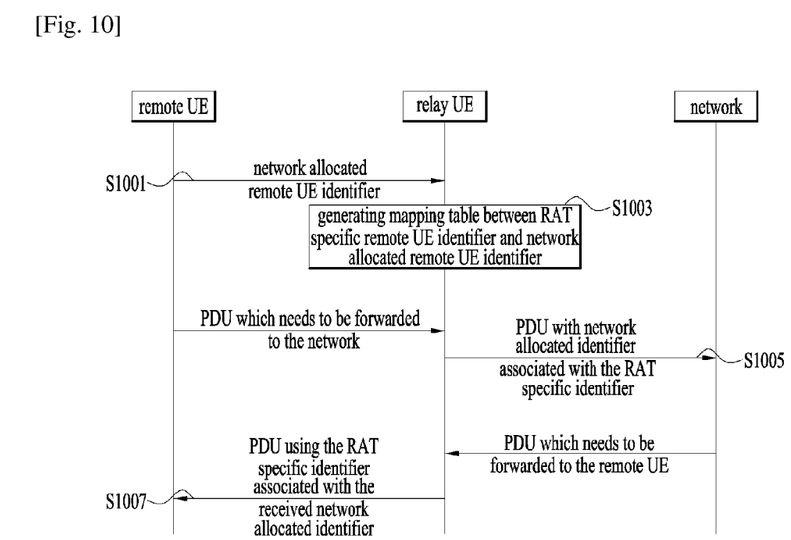

FIG. 10 is a conceptual diagram for performing management of different IDs in a Relay UE in wireless communication system according to embodiments of the present invention. In the methods, the remote UE informs its network allocated identifier to relay UE upon detecting a certain event with limited number of times.

The remote UE triggers informing its network allocated remote UE identifier to the connected relay UE, i) when a remote UE receives a new network allocated identifier, or ii) when a remote UE establishes connection with a new relay UE. (The connection establishment is PC5-connection establishment, pairing establishment or successful association/authentication completion) (S1001).

Preferably, network allocated remote UE identifier can be C-RNTI, resume identity, S-TMSI, and other eNB allocated identifier.

When the remote UE informs its network allocated identifier to relay UE, it performs in the following manner.

A RRC layer of the remote UE acquires a new network allocated identifier, and RRC layer of the remote UE provides the identifier to adaption layer of the remote UE. Then, adaption layer of the remote UE includes the network allocated identifier and the remote UE transmits it to the relay UE.

Preferably, the identifier could be transmitted without the data.

Preferably, the adaption layer of the remote UE includes the network allocated identifier limited number of times and transmits the packet/PDU limited number of times. The number can be fixed to 1 or any positive integer number. The number can be configured by the network.

After sending the network allocated identifier fixed/configured times, the adaption layer of the remote UE does not include the network allocated identifier any more.

Upon receiving the network allocated identifier from the remote UE, the relay UE constructs mapping table between RAT specific remote UE identifier and network allocated remote UE identifier (S1003).

In case of non-3GPP (e.g WLAN, Bluetooth) sidelink, the relay UE makes a mapping table between the received network allocated remote UE identifier and the acquired RAT specific remote UE identifier. The RAT specific identifier is acquired by each RA.

If sidelink communication type between the remote UE and the relay UE is WLAN, the RAT specific identifiers can be SSID, BSSID, or HESSID. If sidelink communication type between the remote UE and the relay UE is Bluetooth, the RAT specific identifiers can be device ID or Bluetooth address.

In case of PC5 sidelink, it is assumed that the remote UE transmits the ProSe UE ID in MAC (sub)header. The relay UE makes a mapping table between the received network allocated remote UE identifier and acquired ProSe UE ID.

After constructing mapping table, if the relay UE receives packet/PDU (which needs to be forwarded to the network) without network allocated identifier from the remote UE, the adaption layer of the relay UE adds network allocated identifier associated with the RAT specific identifier according to the mapping rule and transmits the received packet to the network (S1005).

After constructing mapping table, if the relay UE receives PDU (which needs to be forwarded to the remote UE) with network allocated identifier from the network, the adaption layer of the relay UE removes network allocated remote UE identifier and sends the received PDU to the remote UE using the RAT specific identifier associated with the received network allocated identifier (S1007).

With this method, it is possible for the relay UE to be aware of the mapping between RAT specific identifier and network allocated identifier.

At the same time, with limited number of transmission of network allocated identifier, the signalling overhead could be reduced. This would result in battery saving of the remote UE.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a relay user equipment (UE) operating in a wireless communication system, wherein the relay UE relays data between a remote UE and a network, the method comprising:
    receiving, from the network, information for a mapping table between (i) a set of radio access technology (RAT) specific identifiers (IDs) and (ii) a set of network allocated IDs,
    wherein the set of RAT specific IDs include IDs which are used between the relay UE and the remote UE to identify the remote UE, wherein the set of network allocated IDs include IDs which are used between the relay UE and the network to identify the remote UE, wherein the remote UE is configured to connect to the relay UE;
    based on receiving an uplink (UL) packet, which is to be forwarded to the network, from the remote UE identified by a first RAT specific ID, wherein the UL packet does not include a network allocated ID: (i) based on the mapping table, adding a first network allocated ID which is associated with the first RAT specific ID to the UL packet, and (ii) transmitting the UL packet with the first network allocated ID to the network; and
    based on receiving a downlink (DL) packet, which is to be forwarded to the remote UE, from the network, wherein the DL packet includes a second network allocated ID: (i) removing the second network allocated ID from the DL packet, and (ii) based on the mapping table, transmitting the DL packet to the remote UE using a second RAT specific ID which is associated with the second network allocated ID.

2. The method according to claim 1, wherein the set of RAT specific IDs is transmitted from the remote UE via a RRC message to the network, when the remote UE and the relay UE are connected via sidelink.

3. The method according to claim 1, wherein the set of RAT specific IDs includes one or more RAT specific IDs according to sidelink communication type between the remote UE and the relay UE.

4. The method according to claim 1, wherein the set of network allocated IDs includes one or more network allocated remote UE IDs.

5. The method according to claim 1, wherein a size of each ID included in the set of RAT specific IDs is larger than a size of each ID included in the set of network allocated IDs.

6. A relay user equipment (UE) for operating in a wireless communication system, wherein the relay UE relays data between a remote UE and a network, the relay UE comprising:
    a radio frequency (RF) module; and
    a processor operably coupled with the RF module and configured to:
    receive, from the network, information for a mapping table between (i) a set of radio access technology (RAT) specific identifiers (IDs) and (ii) a set of network allocated IDs,
    wherein the set of RAT specific IDs include IDs which are used between the relay UE and the remote UE to identify the remote UE, wherein the set of network allocated IDs include IDs which are used between the relay UE and the network to identify the remote UE, wherein the remote UE is configured to connect to the relay UE, based on receiving an uplink (UL) packet, which is to be forwarded to the network, from the remote UE identified by a first RAT specific ID, wherein the UL packet does not include a network allocated ID: (i) based on the mapping table, add a first network allocated ID which is associated with the first RAT specific ID to the UL packet, and (ii) transmit the UL packet with the first network allocated second ID to the network, and based on receiving a downlink (DL) packet, which is to be forwarded to the remote UE, from the network, wherein the DL packet includes a second network allocated ID: (i) removing the second network allocated ID from the DL packet, and (ii) based on the mapping table, transmitting the DL packet to the remote UE using a second RAT specific ID which is associated with the second network allocated ID.

7. The relay UE according to claim 6, wherein the set of RAT specific IDs is transmitted from the remote UE via a RRC message to the network, when the remote UE and the relay UE are connected via sidelink.

8. The relay UE according to claim 6, wherein the set of RAT specific IDs includes one or more RAT specific IDs according to sidelink communication type between the remote UE and the relay UE.

9. The relay UE according to claim 6, wherein the set of second network allocated IDs includes one or more network allocated remote UE IDs.

10. The relay UE according to claim 6, wherein a size of each ID included in the set of RAT specific IDs is larger than a size of each ID included in the set of network allocated IDs.

11. The relay UE according to claim 6, wherein the relay UE is capable of communicating with at least one of another UE, a UE related to an autonomous driving vehicle, a base station or a network.

* * * * *